United States Patent [19]
Asano et al.

[11] Patent Number: 4,664,605
[45] Date of Patent: May 12, 1987

[54] OIL SEALING DEFLECTOR

[75] Inventors: Masumi Asano, Okazaki; Noriaki Hattori, Toyota, both of Japan

[73] Assignees: Toyota Jidosha Kabushiki Kaisha; Aisin Seiki Kabushiki Kaisha, both of Aichi, Japan

[21] Appl. No.: 807,240

[22] Filed: Dec. 10, 1985

[30] Foreign Application Priority Data

Dec. 20, 1984 [JP] Japan .......................... 59-192113[U]

[51] Int. Cl.⁴ ...................... F04B 17/00; F01M 11/08
[52] U.S. Cl. .................................. 417/407; 184/6.11; 184/6.23
[58] Field of Search ...................... 417/405, 406, 407; 60/605, 39.08; 184/6.11, 6.16, 6.23

[56] References Cited

U.S. PATENT DOCUMENTS

| | | | |
|---|---|---|---|
| 3,834,156 | 9/1974 | Cutler et al. | 417/407 |
| 4,009,972 | 3/1977 | Sarle | 417/407 |
| 4,095,857 | 6/1978 | Palmer | 417/407 |
| 4,279,576 | 7/1981 | Okano et al. | 417/407 |
| 4,370,106 | 1/1983 | Lauterbach | 417/407 |
| 4,480,440 | 11/1984 | Harper et al. | 60/605 |

Primary Examiner—Louis J. Casaregola
Assistant Examiner—Timothy S. Thorpe
Attorney, Agent, or Firm—Parkhurst & Oliff

[57] ABSTRACT

An oil sealing deflector for a turbocharger includes a substantially circular stepped plate which has a central plate portion having a center hole in which a rotor shaft of the turbocharger can be freely inserted, a peripheral plate portion, and an intermediate recessed plate portion provided between the central plate portion and the peripheral plate portion to define an oil reservoir. The peripheral plate portion has an opening for discharging the oil in the oil reservoir. The deflector further includes a tongue which extends from the plane of the recessed plate portion through the opening of the peripheral plate portion.

4 Claims, 5 Drawing Figures

Fig. 2
PRIOR ART
Fig. 3
PRIOR ART
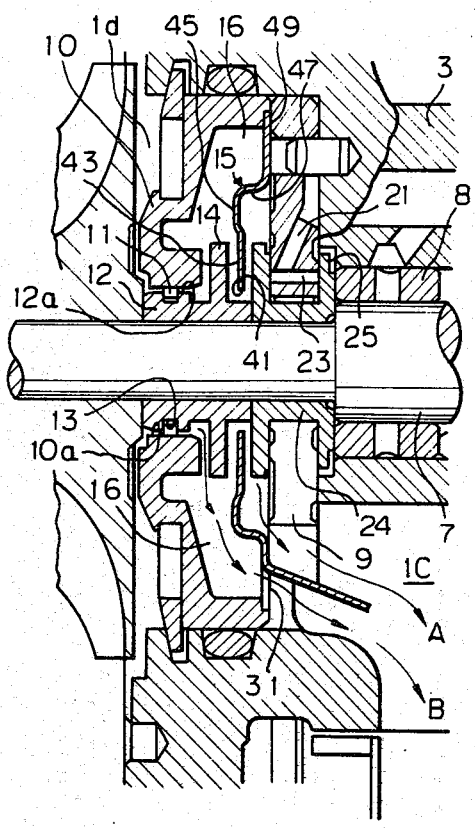
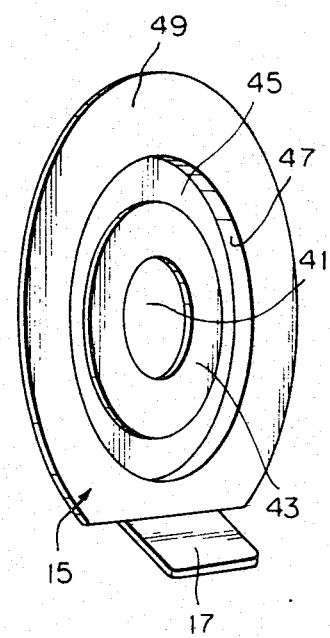

Fig. 4
Fig. 5
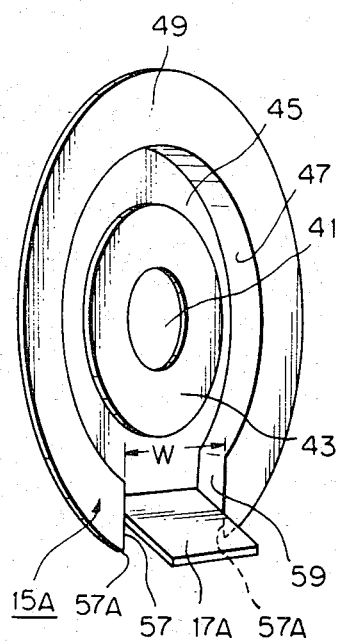
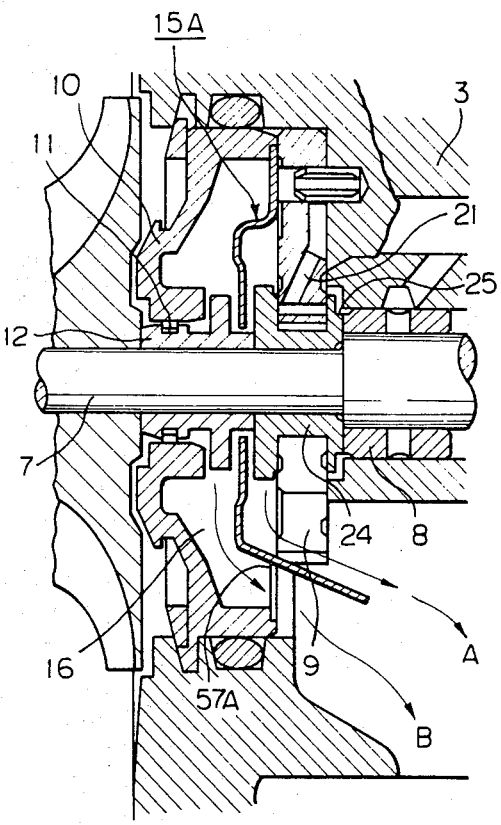

OIL SEALING DEFLECTOR

BACKGROUND OF THE INVENTION

1. Field of the Invention

The present invention relates to a turbocharger, more particularly to an oil sealing deflector for preventing leakage of lubricating oil into a compressor chamber of a turbocharger, particularly at a high speed of an internal combustion engine.

2. Description of the Related Art

Generally, a rotor shaft of a turbocharger for connecting a turbine wheel and a compressor wheel is rotatably supported in a turbocharger housing by means of a full-floating bearing device. The turbocharger housing is usually comprised of a turbine housing, a bearing housing, and a compressor housing. The lubricating oil is fed to the full-floating bearing device and other bearing portions, such as a thrust bearing, to lubricate them. In order to prevent the lubricating oil from entering the compressor chamber, a noncontacting oil seal device is provided between the bearing housing and the compressor housing. Generally, the oil seal device includes an oil sealing deflector which prevents the entrance of the oil into the compressor chamber. Since the deflector forms a baffle to the oil flow, foam tends to occur. The foam prevents the smooth flow of the lubricating oil or smooth drainage of the oil.

SUMMARY OF THE INVENTION

The primary object of the present invention is therefore to provide an improved oil sealing deflector which can ensure smooth oil flow as well as a smooth oil drainage by decreasing or eliminating the production of foam in the oil.

In order to achieve the object mentioned above, according to the present invention, there is provided an oil sealing deflector in a turbocharger having a turbine wheel and a compressor wheel connected to the turbine wheel by means of a rotor shaft, between bearing means adjacent to the compressor wheel for rotatably supporting the rotor shaft and seal means provided around the rotor shaft between the bearing means and the compressor wheel, for preventing lubricating oil from flowing past the seal means, wherein the deflector includes a substantially circular stepped plate which has a central plate portion having a center hole in which the rotor shaft can be freely inserted, a peripheral plate portion, and an intermediate recessed plate portion provided between the central plate portion and the peripheral plate portion to define an oil reservoir.

According to the present invention, the peripheral plate portion is provided with an opening for discharging the oil in the oil reservoir, and the deflector further includes a tongue which extends from the plane of the recessed plate portion through the opening of the peripheral plate portion.

BRIEF EXPLANATION OF THE DRAWINGS

The invention will be described below in detail with reference to the accompanying drawings, in which:

FIG. 2 is an enlarged sectional view of a noncontacting oil seal device shown in FIG. 1;

FIG. 3 is an enlarged perspective view of a deflector incorporated in a noncontacting oil seal device shown in FIG. 2;

FIG. 4 is an enlarged perspective view of a deflector according to the present invention; and FIG. 5 is a longitudinal sectional view of an oil seal device, having a deflector shown in FIG. 4, incorporated in a turbocharger.

DESCRIPTION OF THE PREFERRED EMBODIMENTS

Figure 1:
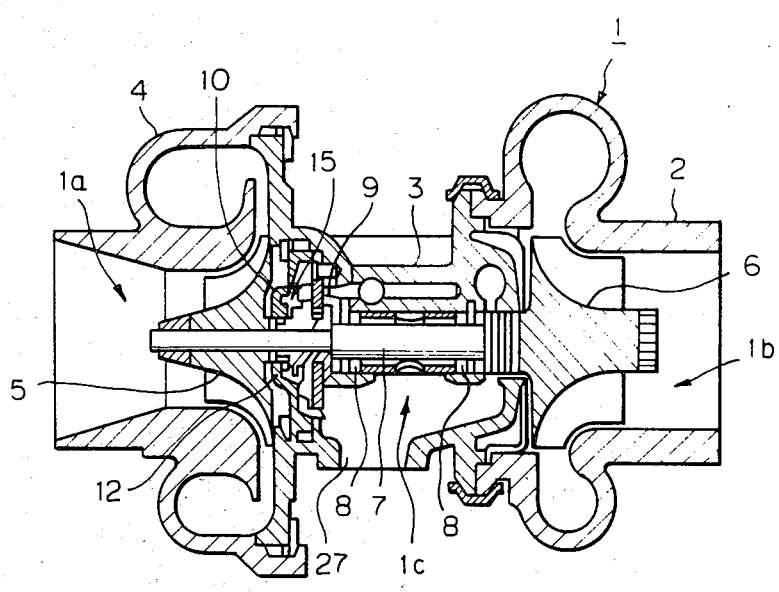
FIG. 1 is a longitudinal sectional view of a turbocharger having a noncontacting oil seal device of the prior art incorporated therein.

With first reference to FIGS. 1 to 3 showing the prior art, a turbocharger housing 1 has a turbine housing 2, a bearing housing 3, and a compressor housing 4. A compressor wheel 5 which is located in a compressor chamber 1a is connected to a turbine wheel 6 which is accommodated in a turbine chamber 1b by means of a rotor shaft 7, so that the rotation of the turbine wheel which is driven, for example, by exhaust gas of an internal combustion engine, is transmitted to the compressor wheel 5 by means of the rotor shaft 7. In a lubrication chamber 1c in the bearing housing 3, the rotor shaft 7 is rotatably supported by the bearing housing 3 through supporting means, such as full-float bearings 8, a thrust bearing 9, a thrust collar 24, etc. Lubricating oil can be fed into the lubrication chamber 1c of the bearing housing 3 through oil passages 21, 23, and 25 to lubricate the thrust bearing 9 and the full-float bearings 8. The lubricating oil is discharged from a drain opening 27 provided on the lower portion of the lubrication chamber 1c, as shown by arrows A. The lubricating oil can be fed from an oil source (not shown).

In the turbocharger as mentioned above, a non-contacting oil seal device is provided to prevent the oil from entering the compressor chamber 1a.

The noncontacting oil seal device of the prior art is illustrated in FIGS. 2 and 3.

A ring seal 11 is provided on an inner periphery 10a of a retainer 10 which is attached to the housing 1 in the vicinity of the compressor chamber 1a to provide a seal arrangement. An annular groove 13 is provided on an outer periphery 12a of a collar 12 which is secured to the rotor shaft 7 adjacent to the compressor wheel 5 in, for example, press fitting, to receive the ring seal 11 in the annular groove 13. Between the outer periphery 12a of the collar 12 and the inner periphery 10a of the retainer 10 is provided a small gap. A similar gap is also provided between the periphery of the ring seal 11 (opposed end faces and an inner peripheral surface of the ring seal 11) and the inner wall surface (opposed side wall surfaces and a peripheral bottom surface) of the collar 12 that defines the groove 13.

These gaps ensure a noncontacting ring seal between the inner periphery 10a of the retainer 10 and the outer periphery 12a of the collar 12, to prevent entrance of the lubricating oil into the compressor chamber 1a from the lubrication chamber 1c in the bearing housing 3.

On the other hand, a flange 14 is provided on the outer periphery 12a of the collar 12 and a deflector 15 is provided between the retainer 10 and the thrust bearing 9 (or the thrust collar 24). The deflector 15 is in the form of a stepped disc plate and is opposed to and spaced from the flange 14 at the inner surface of the disc plate so as to define a seal chamber 16 between the deflector 15 and the retainer 10. The deflector 15 substantially prevents the flow of the lubricating oil from the lubrication chamber 1c toward the seal chamber 16, alone or in cooperation with the flange 14.

The deflector 15 is secured to an immovable portion, such as the bearing housing 3, by means of the retainer 10. On the other hand, the collar 12 rotates together with the rotor shaft 7. Accordingly, it is impossible for the deflector 15 to come into contact with the outer periphery of the collar 12. Therefore, the oil can leak into the seal chamber 16 past the space between the deflector 15 and the collar 12. The oil thus leaked in the seal chamber 16 is returned to the drain opening 27 through an opening 31 which is provided below the deflector 15.

The deflector 15 has, as can be seen from FIG. 3, a central plate 43 having a center hole 41, a diameter of which is slightly larger than the outer diameter of the rotor shaft 7. Exactly speaking, the diameter of the center hole 41 of the deflector 15 is slightly larger than the outer diameter of the collar 12 attached to the shaft 7. The deflector 15 also has a recessed or stepped portion 45 which surrounds the central plate 43 integral therewith and an outer peripheral plate 49 surrounding the recessed portion 45 integral therewith. The deflector 15, which is in the form of a stepped disc plate, can be made, for example, by a press or drawing process per se known. The recessed portion 45 provides an oil reservoir and defines a circumferential wall or shoulder 47 between the recessed portion 45 and the outer peripheral plate 49. The circumferential shoulder 47 is preferably perpendicular to the plane of the recessed plate portion 45 and receives the oil scattered due to the centrifugal force when the turbocharger operates, i.e., when the turbine wheel and the compressor wheel rotate, to prevent the oil from scattering out of the deflector. Namely, the circumferential shoulder 47 forms an oil scattering prevention wall.

The deflector 15 is provided, on its lower end, with an oblique tongue (plate) 17 which is integrally connected to the outer peripheral plate 49 and which extends downward and outward from the peripheral plate 49. The tongue 17 can be made, for example, by a bending process of the material of which the deflector is made, so that the tongue is integral with the outer peripheral plate 49. The tongue 17 serves as a guide for the flow of the oil toward the drain opening 27 of the lubrication chamber 1c. If the deflector 15 as constructed above is incorporated in the noncontacting oil seal device of a turbocharger, foaming tends to occur in the oil in the lubrication chamber 1c, in the oil reservoir formed by the recessed portion 45 of the deflector 15, and/or in the seal chamber 16, because the oil is stirred by the rotating rotor shaft 7 and/or the collar 12 rotating together with the rotor shaft 7, or other elements rotating together with the shaft 7, particularly at a high engine speed. The foam prevents smooth oil drainage from the ring seal 11. In addition, the foam collects in the oil drain opening portion, barring smooth oil drainage from the bearing housing. It has been experimentally found that the foam tends to gather in the vicinity of the lower end of the circumferential shoulder 47 of the deflector 15, i.e., in the vicinity of the connection of the tongue 17 to the outer peripheral plate 49. This is because the oil in the recessed portion 45 cannot smoothly flow out onto the tongue 17, due to the presence of the shoulder 47, which creates a difference in height between the recessed portion 45 and the peripheral plate 49. Furthermore, the shoulder 45 is a barrier when viewed from the side of the seal chamber 16, so that the foam produced in the seal chamber 16 tends to gather in the vicinity of the opening 31. The lack of smooth drainage of the oil means the possibility of reverse flow of the oil from the opening 15a of the deflector 15 into the seal chamber 16, resulting in a decrease of the seal effect of the seal portion, thus resulting in easy entrance of the oil into the compressor chamber 1d through the space between the ring seal 11 and the annular groove 13 of the collar 12.

As mentioned above, no satisfactory oil seal effect can be realized by the deflector according to the prior art as illustrated in FIGS. 2 and 3.

The present invention is aimed at the provision of an improved oil sealing deflector which can ensure smooth discharge of the oil from the bearing housing as well as smooth discharge of the oil which has entered the oil seal chamber therefrom.

A preferred embodiment of the present invention is illustrated in FIGS. 4 and 5.

Elements the same as those in FIGS. 1 to 3 are designated by the same reference numerals.

The deflector 15A of the present invention, in the form of a substantially circular stepped plate, has the central plate 43 which has the center hole 41 having a diameter slightly larger than the diameter of the rotor shaft 7 or the collar 12, if any, on the rotor shaft 7, the intermediate recessed plate portion 45 surrounding the central plate and defining an oil reservoir, and the outer peripheral plate 49 surrounding the recessed portion 45 and connected to the recessed portion by the circumferential shoulder 47. The recessed portion 45 is recessed toward the turbine wheel 6. The circumferential shoulder (or wall) 47 perpendicular to the plane of the recessed portion 45 prevents the oil from scattering outward from the deflector, similar to the arrangement illustrated in FIGS. 2 and 3.

According to the present invention, the tongue 17A, which corresponds to the tongue 17 in FIGS. 2 and 3 and which guides the flow of the oil toward the drain opening 27 (FIG. 1), extends from the plane of the recessed portion 45, unlike the arrangement in FIG. 3. Namely, the tongue 17A can be made by bending the recessed portion 45, so that there is no height difference between the separation of the tongue 17A from the recessed portion 45 and the recessed portion 45. Turning again to FIG. 3, the tongue 17 extends from the outer peripheral plate 49 and not from the recessed portion 45. Furthermore, according to the present invention, an opening 57 and an opening 59 are formed in the outer peripheral plate 49 and in the circumferential wall 47 at their lower ends, respectively, so that the tongue 17A can extend downward and outward through the openings 57 and 59 from the plane of the recessed portion 45. Preferably, the width w of the openings 57 and 59 is substantially equal to the width of the tongue 17A. The outer peripheral plate 49 has opposed projections 57A which partially define the opening 57, on the opposite sides of the tongue 17A. The projections 57A contribute to the prevention of reverse flow of the oil into the oil seal chamber 16. However, the projections can also bar the flow of the oil from the oil seal chamber 16 and, accordingly, is advantageously designed small. The width, the inclination, and the bending position of the tongue 17A are designed at optimum values so as to ensure smooth flow of the lubricating oil.

As can be understood from the above discussion, according to the present invention, since there is no height difference or step between the tongue and the oil reservoir defined by the recessed portion of the deflector, the oil can smoothly flow from the oil reservoir to the drain portion through the tongue, thus resulting in decreased production of foam in the oil. In addition, according to the present invention, even if foam occurs in the oil reservoir, there is no clogging with foam of the connection between the tongue and the oil reservoir or the stepped portion in the vicinity of the connection. Furthermore, part of the oil which has entered the oil seal chamber can be easily discharged, without producing foam, toward the draining opening 31, since there is no step which otherwise would exist behind the tongue in the vicinity of the draining opening.

We claim:

1. An oil sealing deflector for use in a turbocharger; said turbocharger comprising: a turbine wheel; a compressor wheel connected to said turbine wheel by means of a rotor shaft; bearing means adjacent said compressor wheel for rotatably supporting said rotor shaft; and seal means provided around said rotor shaft between said bearing means and said compressor wheel;

said oil sealing deflector comprising: a substantially circular stepped plate and a tongue;

wherein said substantially circular stepped plate comprises a central plate portion having a center hole, a peripheral plate portion, a circumferential opening provided in said peripheral plate portion, and an intermediate recessed plate portion provided between said central plate portion and said peripheral plate portion to define an oil reservoir, said intermediate recessed plate portion lying on a plane, and wherein said tongue comprises an oblique plate which extends outward from the plane of said intermediate recessed plate portion through said circumferential opening provided in said peripheral plate portion.

2. A deflector according to claim 1, further comprising a circumferential wall surrounding the recessed plate portion.

3. A deflector according to claim 2, wherein said circumferential wall is perpendicular to the plane of the intermediate recessed plate portion.

4. A deflector according to claim 1, wherein said circumferential opening provided in said peripheral plate portion has a width substantially identical to a width of the tongue.

* * * * *